June 30, 1953   A. F. S. MUSANTE   2,643,932
WIND DIRECTION RECORDER
Filed Aug. 1, 1950
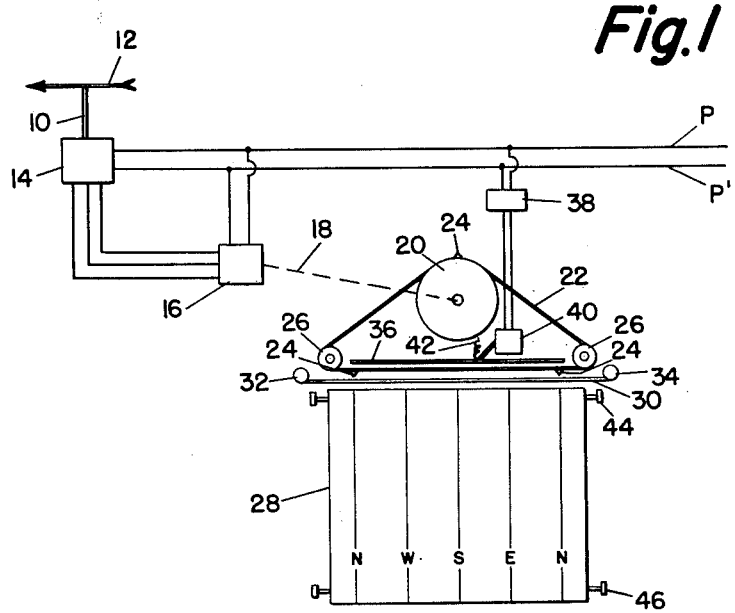
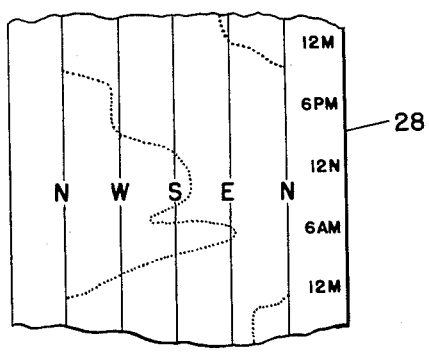
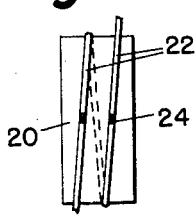
*INVENTOR.*
Augustine F. S. Musante
BY
Busser and Harding
ATTORNEYS Patented June 30, 1953

2,643,932

UNITED STATES PATENT OFFICE 2,643,932

WIND DIRECTION RECORDER

Augustine F. S. Musante, Media, Pa., assignor to Sun Oil Company, Philadelphia, Pa., a corporation of New Jersey Application August 1, 1950, Serial No. 177,090

1 Claim. (Cl. 346—8)

This invention relates in general to wind direction indicators and more particularly to recorders operated by and in conjunction with such devices.

Combined wind direction indicators with recording devices are well known. From simple mechanical indicators, these devices have developed to recording mechanisms actuated electrically and capable of collecting varied information. Seldom is the wind direction recorder used alone, but is often combined with wind velocity recorders and air pollution detectors. It is an object of this invention to provide a wind direction recorder which may readily be used in combination with other recording devices.

The mechanically operated wind direction recorders, as distinguished from the electrically actuated type, usually include a cam operated stylus to record direction changes. This is objectionable under gusty wind conditions particularly when the wind vane is revolved through complete revolutions. Damping devices and unusual cam designs have been introduced to counteract such conditions, but, in general, have not been found satisfactory. It is another object of the invention to provide a wind direction recorder free of the mechanical defects of cam operation.

The later developments in this field have stressed the use of electricity and electro-mechano combinations to transmit the rotary movement of the vane to a convenient remote position. The records of these devices are difficult to read because the same generally involved cam mechanisms are used to translate the rotary motion to linear chart-tracing mechanisms. Records so produced usually require that a supplementary marginal tracing be read in conjunction with the principal tracing to find the true record of direction. It is a further object of this invention to provide a correct and easily readable record of all the wind direction variations.

In accordance with the present invention, the motion of a wind vane is transmitted to an endless belt which includes a number of marking means. A direction marked chart arranged to move below the belt by a time synchronized mechanism receives the periodic markings of the marking means. As the belt responds to all the movements of the wind vane, the markings range the chart and indicate, directly and clearly, the wind direction variations.

In order that a better understanding of the invention may be had, reference is made to the following detailed description and the drawings in which:

Figure 1 is a view of the device, partially diagrammatic,

Figure 2 shows a detail of Figure 1,

Figure 3 is a portion of the record strip or chart.

A wind direction recorder to overcome the objectionable features of known devices must have at least two totally distinct characteristics: it must be capable of sensitive and complete response, and it must provide a correct and easily translated record. Accordingly, a preferred embodiment of the invention, referring to Figures 1 and 2 of the drawing, is constituted by a responsive marking device free of mechanical complications, and a chart properly graduated and arranged to receive the marking.

In Figure 1 of the drawing mounted to rotate responsively to wind direction on shaft 10, is shown the conventional weather vane 12. This is symbolically indicated and may take any preferred form. The movement of the vane 12 is transmitted through the shaft 10 to the responsive means 14 which, in the preferred form, is one of a pair of self-synchronizing motors. The position established in the responsive device 14 is transmitted electrically, by well-known principles, to a like responsive device 16. Although the diagrammatically illustrated self-synchronizing electrical motors 14 and 16 are indicated in the preferred embodiment because of their sensitive and precise response, other motion transmitting devices are not precluded.

The position of vane 12, assumed by the responsive electric motor 16, is transmitted through a simple, direct shaft coupling 18 to the drive wheel or drum 20 of the marking device. An endless belt 22, including marking means as a part thereof shown in the preferred embodiment as protuberances 24, passes over the drive wheel 20. As the belt 22 must respond exactly to all movements of the wheel 20 it is shown as a preferred arrangement that the belt 22 be looped for one or more complete turns on the wheel, as shown in Figure 2, to prevent slippage. Any well-known arrangement to prevent slippage may be used.

Arranged in equal spacing on the belt 22, the markers shown here as protuberances or points 24 face outwardly from the wheel engaging face of the belt and are thus free to pass over the positioning idler wheels 26. To keep the belt 22 and the attached marking points 24 in marking position relative to the record chart 28, the idler wheels 26 are positioned beyond the marginal ends of the chart 28 and immediately above it.

Between the chart 28 and the belt positioned markers 24, a depressible inked surface 30, for example a typewriter ribbon, is suspended between the rollers 32 and 34. It will be understood that the inked surface 30 is sufficiently close to the chart 28 to be pressed into contact by the downward movement of the marking points 24. The necessary pressure to contact the markers 24 with the chart 28 through the inked surface 30 is periodically supplied by the striking bar 36. To be effective the striking bar 36 must be parallel to the receiving surface of the chart 28 and must operate to press the points 24 downwardly at approximately 5 to 10 times every minute.

One simple arrangement for vibrating the striking bar 36 at a constant rate is illustrated although other methods and devices are equally well suited to this purpose. A time switch 38, energized from the power circuit P and P' which actuates the self-synchronous motors 14 and 16 described above, is electrically connected to a solenoid 40. The periodic energizing of the solenoid 40 by the time switch 38 pulls the striking bar 36 downward to contact the belt 22 and is then returned, when the circuit is broken, by the resilient member, or spring 42.

The chart 28, arranged as explained above to receive the periodic marking of the marking points 24 as they are pressed on the inked surface 30, is rolled into and away from marking position by a time synchronized mechanism. Means for operating the chart, mechanically or electrically, such as by a clockwork device or by a time controlled electric motor, are well-known in the art and therefore need not be shown. The platen 44 is positioned to pass the chart 28 over it from a supply roll not shown, and to hold the chart at a level to be marked. The winding roller 46 which is operated by the timed chart moving mechanism moves the chart as required.

Figure 3 shows a section of the chart 28 on which a typical record is reproduced. The right margin is marked from the bottom of the chart upward with a time scale here shown as hours' marking the day into six hour divisions. Any time scale on which days and months, as well as weeks, minutes and hours are shown, is readily adapted to the device. Longitudinally the chart is divided into four bands within the marginal lines. The five equally spaced lines making these divisions are lettered N, W, S, E and N in that order from left to right and indicate the four main compass points. This is the preferred arrangement of direction indication but may be changed if desired, it being required only that the marginal lines repeat the same direction. The N or north line is shown here as the limiting direction on each side of the chart and is repeated accordingly. Arranged in this manner east and west are indicated to the right and left of the center or south line respectively. This conforms to map reading practices and avoids confusion.

In discussing the operation of the device, it will be necessary to some extent to review some of the detail covered above and thus far fully understood by those versed in the art. However, to fully disclose the advantages of this invention and further add to the structural features, the operation will be discussed in detail.

It will be readily understood that the exact movements of the weather vane 12 must be transmitted correctly to the drive wheel 20 of the marking elements. The self-synchronous motors 14 and 16 are here preferred although other means of transmission of motion are indicated. Any movement of drive wheel 20 is transmitted to the marker-provided endless belt 20. Consequently, the markers 24 are moved forward or backward across the face of the chart 28 in response to the movement of the wind vane 12.

To avoid confusion of markings and indicate correctly when the wind moves from marginal lines to directions on either side shown here from the north into either the east or west, the equal spacing between the marking points is exactly that of the width of the chart between the lines marked N—N, here shown as the border lines. Therefore, as one marker moves on the chart marking the wind direction either to one side or the other of the N line, the other markers move accordingly with this movement and those adjacent to the marker in marking position either advance onto the chart or move away from it. This spacing requirement between marker points also controls the length of the endless belt 22 which must be an equal multiple of these space lengths. Further, the circumference of the drive wheel 20 must equal the width of the chart between the marginal lines shown as N—N and, consequently, the marking point spacing.

The dimensions of the direction marking mechanism constructed as outlined results in the complete rotation of the weather vane 12 being accompanied by a complete rotation of the drive wheel 20 which in turn moves one marker point completely across the chart from the marginal lines N to N. At no time is there a position of the belt where a marker is removed completely from marking engagement. Therefore, a revolution or many revolutions of the weather vane merely moves successive marking points into position to mark the record chart.

The marking of the chart is maintained in constant operation because of the periodic movement of the striking bar 36 operated by the solenoid 40 and the retaining spring 42. The electrical energizing of the solenoid is determined periodically by the time switch 38. An inked surface for the marking points 24 to press down on the chart 28 is presented by the ribbon 30 which, like a typewriter ribbon, may be adjusted to present a freshly inked area under the markers as required. The chart 28 having been started to operate by its moving clock-work arrangement or other device and coordinated with the time and date, will show the wind directions recorded accurately for the period covered.

An example of the recording operation and the resulting ease with which the record can be read is seen in Figure 3 illustrating a marked section of the record strip marked with north on the marginal lines. After 12 m. of the day under consideration the wind is seen moving out of the east and into the north, reading the chart from the bottom up, the marking point moving steadily to and off the right hand edge of the chart. The wind vane continued to rotate through the north toward the west and brought the next succeeding marking point into operation on the chart from the left. At 6 a. m. the wind moved through the west and south and veered through the east back to the south at 9 a. m. At noon the winds were generally from the south and southwesterly direction from which they moved steadily back through the west to the northwest and thence to the north. This last movement of the marking device moved the operating marking point off the chart to the left through the north about 9 p. m. where it was replaced on the right of the chart by the adjoining marker to continue the marking through the northeast and east.

From the above description, it is apparent that an apparatus is provided which gives a record of the wind direction variations in all details. The apparatus may be used either as a separate device or readily coupled with other wind measuring instruments such as velocity recorders and samplers to give additional information. Further, the device is free of complicated mechanical parts, the elimination of which gives trouble-free and accurate operation. The chart produced by the working mechanism is detailed but clear and understandable and needs no further check or reference to indicate the wind direction. The record is continuous and permanent as well as intelligible.

No attempt has been made in the specification to describe in detail those parts of the device which are readily available on the market. It is contemplated that the customary apparatus well-known in the art will be used. Likewise, the physical arrangement of the necessary endless belt with marking points, dimensioned as required, together with the specifically detailed chart and marker arrangement illustrated in the drawing, is merely suggestive and not limiting and any suitable arrangement may be used. Various other modifications may be made in the design of the apparatus without departing from the spirit of the invention or the scope of the appended claim.

I claim:

A wind direction recording instrument which comprises, in combination, a weather vane mounted for rotation in response to the change in wind direction, an electric circuit, an electrically-controlled responsive device, within said electric circuit, to which the movement of the vane is transmitted, a second electrically-controlled responsive device within said electric circuit to which movement is transmitted by the first responsive device, a rotatable drum, a mechanical drive from the second responsive device to said drum, a chart and means to move the same longitudinally at a predetermined speed, the chart having inscribed thereon five parallel longitudinally extending lines of which the end lines have the same compass insignia and the other three lines the other three compass insignia, an inked ribbon located above and close to the record chart, a transversely extending presser bar located above the inked ribbon, idler pulleys above the opposite edges of the traveling record, an endless belt engaging said drum and the idler pulleys, one reach of which belt extends transversely between the inked ribbon and the presser bar and provided with three markers spaced apart longitudinally of the belt distances corresponding to the distance between the end lines of the chart, a timing device and a solenoid operable thereby, and within said electric circuit, adapted to periodically move said presser bar against said inked ribbon and thereby move the inked ribbon toward the traveling chart and thus cause a marker to impress a mark upon the traveling chart.

AUGUSTINE F. S. MUSANTE.

References Cited in the file of this patent

UNITED STATES PATENTS

| Number | Name | Date |
|---|---|---|
| 364,802 | Childs | June 14, 1887 |
| 1,958,909 | Chappell et al. | May 15, 1934 |
| 2,169,230 | De Martile | Aug. 15, 1939 |
| 2,437,242 | Cole et al. | Mar. 9, 1948 |
| 2,464,970 | Finch | Mar. 22, 1949 |
| 2,500,746 | Ellenberger | Mar. 14, 1950 |
| 2,591,138 | Cooley | Apr. 1, 1952 |